(12) United States Patent
Hnat et al.

(10) Patent No.: US 8,277,766 B2
(45) Date of Patent: Oct. 2, 2012

(54) METHODS FOR THE CONCENTRATION OF VANADIUM FROM CARBONACEOUS FEEDSTOCK MATERIALS

(76) Inventors: James G. Hnat, Collegeville, PA (US); Mark A. Schaffer, Trappe, PA (US)

( * ) Notice: Subject to any disclaimer, the term of this patent is extended or adjusted under 35 U.S.C. 154(b) by 63 days.

(21) Appl. No.: 12/978,686

(22) Filed: Dec. 27, 2010

(65) Prior Publication Data

US 2012/0164040 A1  Jun. 28, 2012

(51) Int. Cl.
*C22B 34/00* (2006.01)
(52) U.S. Cl. .................. 423/62; 423/64; 75/622
(58) Field of Classification Search .............. 423/62, 423/64; 75/622
See application file for complete search history.

(56) References Cited

U.S. PATENT DOCUMENTS

| | | | |
|---|---|---|---|
| 3,226,316 A * | 12/1965 | Metrailer et al. ............. 208/127 |
| 3,873,669 A | 3/1975 | Guillaud | |
| 3,916,617 A | 11/1975 | McKenzie et al. | |
| 4,203,759 A | 5/1980 | Metrailer et al. | |
| 4,243,639 A | 1/1981 | Haas et al. | |
| 4,389,378 A | 6/1983 | McCorriston | |
| 4,420,464 A | 12/1983 | Barclay | |
| 4,443,415 A | 4/1984 | Queneau et al. | |
| 4,536,374 A | 8/1985 | McCorriston | |
| 4,551,223 A * | 11/1985 | Sadhukhan ................ 208/414 |
| 4,645,651 A | 2/1987 | Hahn et al. | |
| 4,654,164 A | 3/1987 | Najjar | |
| 4,657,702 A | 4/1987 | Vasconcellos et al. | |
| 4,668,428 A | 5/1987 | Najjar | |
| 4,705,536 A | 11/1987 | Becker et al. | |
| 4,708,819 A | 11/1987 | Vasconcellos et al. | |
| 4,801,402 A | 1/1989 | Najjar et al. | |
| 4,826,627 A | 5/1989 | Najjar | |
| 4,952,380 A | 8/1990 | Najjar et al. | |
| 5,277,795 A | 1/1994 | Thornhill et al. | |
| 5,427,603 A | 6/1995 | Samant et al. | |
| 5,670,061 A * | 9/1997 | Kowallik et al. ............. 210/771 |
| 5,772,726 A | 6/1998 | Woods et al. | |
| 6,193,941 B1 | 2/2001 | Buxel et al. | |
| 6,231,640 B1 | 5/2001 | Malone et al. | |
| 6,235,253 B1 | 5/2001 | Holcombe et al. | |
| 6,241,803 B1 | 6/2001 | Fuji | |
| 6,241,806 B1 * | 6/2001 | Malone et al. .................. 75/622 |
| 6,284,214 B1 | 9/2001 | Holcombe et al. | |
| 6,652,819 B2 * | 11/2003 | Shiroto et al. ................. 423/62 |
| 2009/0057202 A1 * | 3/2009 | Kulkarni et al. .......... 208/251 R |
| 2010/0047141 A1 * | 2/2010 | Hnat et al. ..................... 423/59 |

* cited by examiner

*Primary Examiner* — Steven Bos
(74) *Attorney, Agent, or Firm* — Eckert Seamans Cherin & Mellott, LLC; Arnold B. Silverman

(57) ABSTRACT

This invention relates to a process that utilizes high-temperature oxidation with controlled stoichiometry in the concentration of vanadium from carbonaceous feedstock materials containing vanadium, such as residues, ashes and soots resulting from the combustion or gasification of petroleum vacuum residuum, petroleum coke, kerogen from oil shale, and bituminous sand, e.g., tar sand or oil sand, or extra heavy oil or other carbonaceous feedstocks that contain vanadium. A preferred embodiment uses a counter-rotating vortex reactor and a cyclonic, entrained-flow reactor to rapidly heat and oxidize feedstock at temperatures in the range of about 2100° F. to 2900° F., resulting in a vapor stream with entrained, solid materials comprising the concentrated vanadium species. The entrained, vanadium-rich product solids may be removed from the high-temperature vapor stream by a high-temperature filter assembly, with or without the aid of a high-temperature cyclone separator which removes a portion of the vanadium-rich solids upstream of the filter. The filtered vapor stream may be stored or then ducted to suitable unit operations for possible oxidation and heat recovery, followed by entailed pollution control prior to its final discharge to the atmosphere.

26 Claims, 3 Drawing Sheets

METHODS FOR THE CONCENTRATION OF VANADIUM FROM CARBONACEOUS FEEDSTOCK MATERIALS

BACKGROUND OF THE INVENTION

1. Field of the Invention

The present invention relates to methods of thermal processing of carbonaceous feedstock materials containing vanadium, such as petroleum vacuum residuum, petroleum coke, kerogen from oil shale, and bituminous sand, e.g., tar sand or oil sand, or extra heavy oil, as well as carbonaceous ash, soot, or other residue resulting from the incomplete oxidation of these materials, for the purpose of concentrating vanadium and other metal compounds.

2. Description of the Prior Art

Carbonaceous materials that contain significant concentrations of vanadium, apart from their hydrocarbon content, pose significant problems when thermally processed in the presence of oxygen (either as elemental oxygen vapor or as contained in oxides like water vapor or hydrogen peroxide). Typical examples of these carbonaceous materials include petroleum vacuum residuum, petroleum coke, kerogen from oil shale, and bituminous sand e.g., tar sand or oil sand, or extra heavy oil, as well as carbonaceous ash or soot resulting from the incomplete combustion of these materials.

The problems due to thermal processing with oxygen stem from the wide range of melting points exhibited by the oxides of vanadium (ranging from about 1240° F. to 3580° F. for the vanadium-oxygen system alone) depending on the oxidation state, and the detrimental effects of vanadium slags on most refractory materials. Furthermore, depending on the other elements concentrated along with the vanadium in the residue, eutectic mixtures with even lower melting points can form (especially with alkali materials), yielding extremely low-viscosity and highly corrosive slags that may be accompanied by lumps or agglomerates of the higher-melting point, non-eutectic residual material.

Despite the difficulties exhibited by thermal processing of the aforementioned materials, thermal processing of these materials remains the predominant method for concentrating the vanadium since other techniques, such as floatation, extraction, or size classification, are largely irrelevant for these materials due to the vanadium being well dispersed in the organic phases and chemically complexed within porphyrin-like structures where elemental vanadium, vanadium oxides, or vanadium ions cannot be physically separated nor easily chemically extracted from the organic phase. Further sequestration of the vanadium in these materials (especially petroleum coke and some kerogens) is accomplished by the containment of these vanadium-porphyrin complexes within a dense matrix of polycyclic hydrocarbons which can make physical separation or chemical extraction almost impossible. Further advantages of the thermal processing with oxygen over physical separation or chemical extraction are the potential to produce a synthesis gas or by extracting thermal energy from the products of combustion in the same apparatus that accomplishes the concentration. In fact, the value of the synthesis gas or thermal energy typically exceeds the value of the contained vanadium. As a result, most of the processes are designed with the concentration or recovery of vanadium as a secondary concern to the overall economics of the process. Regardless of process economics based on vanadium or energy content, the process must still contend with the slagging and corrosion characteristics of the vanadium species in these residues.

It is apparent from the substantial body of prior art associated with the thermal processing of vanadium-containing, carbonaceous materials, that it has historically been a challenge to process these materials. If the vanadium content in the residue, ash, or soot is sufficiently high, it may be economically feasible to recover the vanadium from these residual materials. It is important that slagging and corrosive nature of these materials be mitigated if economical recovery of vanadium is to be achieved in a practical process.

A majority of the prior art techniques for the recovery of vanadium from residual waste use slagging gasification, hydrometallurgical, molten metal, molten salt, and roasting-hydrometallurgical processing techniques. Because of the challenges associated with vanadium containing slags, a limited number of technology suppliers offer processes for the direct combustion of petroleum coke residues/ashes/soots. Prior art related to the recovery of vanadium from these materials is summarized hereinafter.

The slagging gasifier developed by Texaco Inc. is a high temperature gasification process for the processing of petroleum coke (see, for example, U.S. Pat. Nos. 4,952,380; 4,826,627; 4,801,402; 4,708,819; 4,705,536; 4,668,428; 4,657,702; and 4,654,164). The primary purpose of this gasifier is to produce a synthesis gas from petroleum coke for use in the refining operations. It includes a number of techniques associated with coping with the slagging nature of the vanadium and nickel compounds found in the residuals of petroleum cokes. Under gasification conditions, the vanadium compounds exist primarily as suboxides. The suboxides of vanadium are refractory-like in nature and have high melting points. This, in turn, requires that the gasifier operate at elevated temperatures, which can lead to operational problems and decreases refractory life. This slagging gasification technology uses additives or fluxes to reduce the slagging temperature of the resultant residue to avoid clumping and agglomeration of the slag material so as to allow the effective removal of the slag from the gasifier. The slag removed from the gasifier may contain elevated levels of vanadium which can be further beneficiated using hydrometallurgical techniques.

Marathon Ashland Petroleum LLC discloses a molten metal bath to dissolve the carbon, sulfur, vanadium and nickel in petroleum coke in a molten metal bath (see, for example, U.S. Pat. Nos. 6,284,214; 6,241,803; 6,235,253; and 6,231,640). Oxygen is added to the bath to oxidize the carbon, and reducing gases are added to release the dissolved sulfur as $H_2S$. The vanadium is recovered in a molten slag layer or as dust carried over in the flue gas effluent.

U.S. Pat. Nos. 4,389,378 and 4,536,374 disclose heating petroleum cokes to temperatures of about 1600° F. in the presence of metal sulfates and carbonates followed by hydrometallurgical leaching for the recovery of the vanadium.

U.S. Pat. No. 4,203,759 to Metrailer et al. discloses heating of petroleum coke in a fixed bed or moving bed reactor at a temperature less than 1050° F. so as to avoid the slagging and agglomeration of the contained metal oxides.

U.S. Pat. No. 4,443,415 discloses the processing of petroleum coke in the form of a slurry with an aqueous solution of sodium carbonate in a pressurized autoclave under oxidizing conditions and at moderate temperatures (about 600° F.) to produce a water leachable sodium vanadate that can be separated from the digestion residue.

U.S. Pat. No. 4,645,651 discloses the mixing of a petroleum residue with sodium carbonate and sodium sulfate, heating the mixture to the melting temperature of the mixture, treating the melt material with an aqueous phase and precipitating ammonium polyvanadate, sodium ammonium vanadate or ammonium metavanadate.

U.S. Pat. No. 4,243,639 discloses the gasification of petroleum coke with steam at temperatures in the range of about 1000° F. to 1500° F. in the presence of an alkali metal salt to produce a combustible gas and an inorganic ash containing a water soluble alkali metal vanadate.

U.S. Pat. Nos. 3,196,617 and 4,420,464 disclose the processing of carbonaceous materials in a molten alkali salt bath for the production of a low BTU synthesis gas. The residue may contain water-soluble vanadium compounds.

U.S. Pat. No. 3,873,669 discloses a hydrometallurgical process that involves the treatment of fly ash with a caustic soda solution to solubilize the vanadium contained in the fly ash. The process involves the subsequent treatment with lime, filtering/washing, vaporization and caustic treatment for recovery of the vanadium precipitate.

U.S. Pat. No. 5,772,726 discloses the use of an electric arc furnace with an iron bath to process vanadium containing ash with the addition aluminum as a reductant for the production of a ferrovanadium metal.

U.S. Pat. No. 5,277,795 discloses the combustion of petroleum coke in a slagging cyclone combustor at temperatures up to 2550° F., collecting the molten ash and recovering the metal compounds from the ash. This process is laden with the problems of slagging operation and the associated refractory and metal corrosion of $V_2O_5$ containing slags.

U.S. Pat. No. 5,427,603 discloses a process whereby a vanadium residue is heated to a temperature up to about 1560° F. under substoichiometric conditions with minimum oxygen partial pressure of $10^{-4}$ bar and a maximum oxygen partial of $10^{-2}$ bar, as measured within the region which is occupied by the residue. The patent discloses operation with a multiple hearth furnace, rotary kiln or fluidized bed reactor.

U.S. Pat. No. 6,193,941 discloses a process for producing a synthesis gas from an oil containing heavy metals by partially oxidizing the oil, recovering the soot formed, and subsequently burning the recovered soot in a pulverized fuel burner with a maximum operating temperature of about 1800° F. and an oxygen content above 1% while maintaining a reaction time of at most three seconds. The gas is then cooled to about 850° F. to 1200° F., prior to delivery to a waste heat recovery system and subsequent recovery of the vanadium-rich product.

Despite the foregoing, known methods, there remains a very real and substantial need for a method of thermal processing of carbonaceous materials containing vanadium in order to effect concentration of the vanadium.

SUMMARY OF THE INVENTION

The present invention overcomes many of the complications and disadvantages of the prior art in vanadium concentration processes by providing a relatively simple, efficient, high-intensity (i.e., high processing throughput per reactor cross-sectional area) process with modest capital cost that employs the thermophysical properties of the vanadium oxides, and is unaffected by the low temperature melting and highly corrosive characteristics of vanadium pentoxide.

One embodiment of the invention (see, for example, FIG. 2) includes the following process steps: (1) feeding a fine, granular vanadium-containing feedstock either as a dry, particulate material, or as a wet slurry to an entrained flow reactor; (2) heating and oxidizing the feedstock in the entrained-flow reactor at sufficiently high temperature and near stoichiometric combustion conditions to allow effective oxidation of the carbon and sulfur contained in the residue and in such a manner as to minimize the formation of vanadium pentoxide with the resultant generation of a vanadium-rich particulate; (3) passing the particulate-laden gas stream issuing from the entrained-flow reactor through a high-temperature cyclone separator to effect the removal of a portion of the vanadium-rich particulate from the gas such as air or oxygen (see, for example, FIG. 3), yielding a vanadium-rich product with a majority of particle sizes greater than 40 microns; (4) quenching the particulate-laden gas stream issuing from the high temperature cyclone to create temperature conditions suitable for capture of the vanadium-rich particulate in a high-temperature filter; (5) separating and collecting the particulate stream issuing from the gaseous stream in said high-temperature filter, yielding a second vanadium-rich particulate product, and (6) ducting the particulate-free, gaseous stream to suitable unit operations for waste heat recovery or further material reclamation and pollution control prior to its final discharge to the atmosphere. A preferred size distribution of the feedstocks delivered to the entrained-flow reactor is 90% less than 300 microns.

According to another aspect of the invention, the process comprises the steps of (1) feeding a fine, granular vanadium containing feedstock as either a dry material, or as a wet slurry to an entrained flow reactor; (2) heating and oxidizing the feedstock in the entrained-flow reactor at sufficiently high temperature and near stoichiometric combustion conditions to allow effective oxidation of the carbon and sulfur contained in the residue and in such a manner as to minimize the formation of vanadium pentoxide with the resultant generation of a vanadium-rich particulate; (3) quenching the particulate-laden stream issuing from the entrained flow reactor to create temperature conditions suitable for capture of the vanadium-rich particulate in a high temperature (at least 1000° F.), moderate temperature (500° F.-1000° F.) or low temperature (300° F. to 500° F.) filter; (4) separating and collecting the particulate stream issuing from the gas quench assembly in said filter, yielding a vanadium-rich product, and (5) ducting the particulate-free, gaseous stream to suitable unit operations for waste heat recovery or further material reclamation and pollution control prior to its final discharge to the atmosphere. With this embodiment, the use of a high (500° F. to 1000° F.) or moderate (300° F. to 500° F.) temperature filter may permit economical heat recovery of the flue gas. With the use of a low temperature filter, cost effective heat recovery may not be possible, and the gas exiting the filter may preferably be delivered to an acid gas scrubber or be delivered directly to a flue gas stack assembly, Depending on the end use of the vanadium-rich product manufactured, low levels of residual carbon in the vanadium-rich product may or may not be required. For example, if the vanadium-rich product is used in the production of ferrovanadium by carbon based electric arc reduction, residual carbon levels in the range of 5% to 10% are acceptable and, in fact, desirable. However, if hydrometallurgical techniques are used for leaching the vanadium-rich product, residual carbon levels less than 2% are preferred. For both embodiments, the preferred operating temperature of the entrained flow reactor is in the range of 2100° F. to 2900° F. and the preferred reactor resident time is in the range of 100 ms to 2 seconds, depending on the type and scale of entrained flow reactor utilized. The preferred oxidation stoichiometry within the entrained flow reactor is in the range of 90% to 105%, or at a level required to minimize the formation of vanadium pentoxide. It is through the use of short reaction times, control of reactor stoichiometry, and control of reactor temperature that the slagging behavior of vanadium-containing residue, ash, or soot can be avoided. The first embodiment described above provides the means of forming two (2) primary products: (1) a vanadium-rich granular product (Product 1) with particle sizes primarily greater than about 40 microns, and (2) a vanadium-rich powder with particle sizes typically less than 40 microns (Product 2). Initial separation of the vanadium-rich particulate with a high-temperature cyclone provides the means of producing the relatively coarse-size product along with the additional advantage of reducing the particle loading on the high temperature filter assembly.

Several different methods of quenching the particulate-laden vapor stream, i.e., either the effluent from the entrained flow reactor (in the second embodiment), or the effluent from the high-temperature cyclone (in the first embodiment), can be utilized. Liquids, such as, for example, water, atomized with the assistance of a compressed gas, such as, for example air, direct atomization of a liquid, or dilution with a cooler gaseous stream are methods commonly utilized and have been found to be suitable with the temperatures and environments experienced with the present invention and described herein. The use of directly atomized water or an inert gas as quench media may be advantageous as additional oxygen is not provided to the process stream. Preferred temperatures after temperature quenching are in the range of about 1200° F. to 1800° F. to be compatible with current, commercially-available filter media. (As the upper temperature limit of practical filter media may increase to 2900° F. in the future, quenching may not be required.). The use of a high temperature filter allows the recovery of a vanadium-rich product in particulate form and allows the remaining gas phase species, such as carbon monoxide, carbon dioxide, water vapor, sulfur dioxide, phosphorus pentoxide, and arsenic trioxide vapors, through the high temperature particulate filter for subsequent heat recovery and/or scrubbing of the $SO_2$ in conventional, pollution control unit operations.

In a preferred embodiment of the invention, the entrained flow reactor assembly utilizes a vertically oriented counter-rotating vortex entrained flow reactor followed by a horizontal cyclone reactor, such as that disclosed in Hnat in U.S. Pat. No. 5,114,122; however, other types of entrained flow combustors, pulverized fuel combustors or cyclone type combustors operating in a dry ash mode may also be suitable as devices for use as the entrained flow reactor in this inventions. A major advantage of the counter-rotating vortex reactor is that it provides intense and near instantaneous mixing of the feedstock with the oxidant gas, such as air or oxygen. Therefore, stoichiometric control throughout the mixture of gas and solids suspension is greatly simplified. For pulverized fuel burners that entrain oxidant into the fuel/solids suspension along the axis of feedstock injection, the solids/gas mixing is not as efficient and longer residence times are required to achieve comparable levels of carbon conversion. It is due to the segregation of oxidant and the solids in these latter type burners and combustors that the chances of vanadium pentoxide formation and undesirable slag formation are increased.

It is an object of the present invention to provide a method for the concentration of vanadium from feedstock, such as carbonaceous ash, soot, or other residues resulting from the gasification or incomplete combustion of petroleum vacuum residuum, petroleum coke, kerogen from oil shale, and bituminous sand, e.g., tar sand or oil sand, or extra heavy oil.

It is a further object of the present invention to provide a means of processing said vanadium containing residue, ash or soot in a "dry-ash", i.e., non-slagging, manner.

It is a further object of the present invention to produce a residual stream with increased vanadium content relative to the feedstock, with the vanadium species in said residual stream being in the form of vanadium oxides with minimal formation of fused material.

It is another object of the present invention to provide a clean, hot, exhaust gas with minimal entrained particulate such that efficient and effective heat recovery in boilers and other heat recovery devices can be utilized as well as the subsequent scrubbing of acid gases from the flue gas, e.g., $SO_2$.

These and other objects of the present invention will be more fully understood from the following detailed description of the invention on reference to the illustrations appended hereto.

DETAILED DESCRIPTION OF THE PREFERRED EMBODIMENT

As employed here, the term "carbonaceous feedstock materials containing vanadium" shall expressly include such materials selected from the group consisting of petroleum vacuum residuum, petroleum coke, kerogen from oil shale, bituminous sand, such as tar sand, oil sand, or extra heavy oil, carbonaceous ash, soot, and other residue resulting from the incomplete oxidation of these materials.

Figure 1:
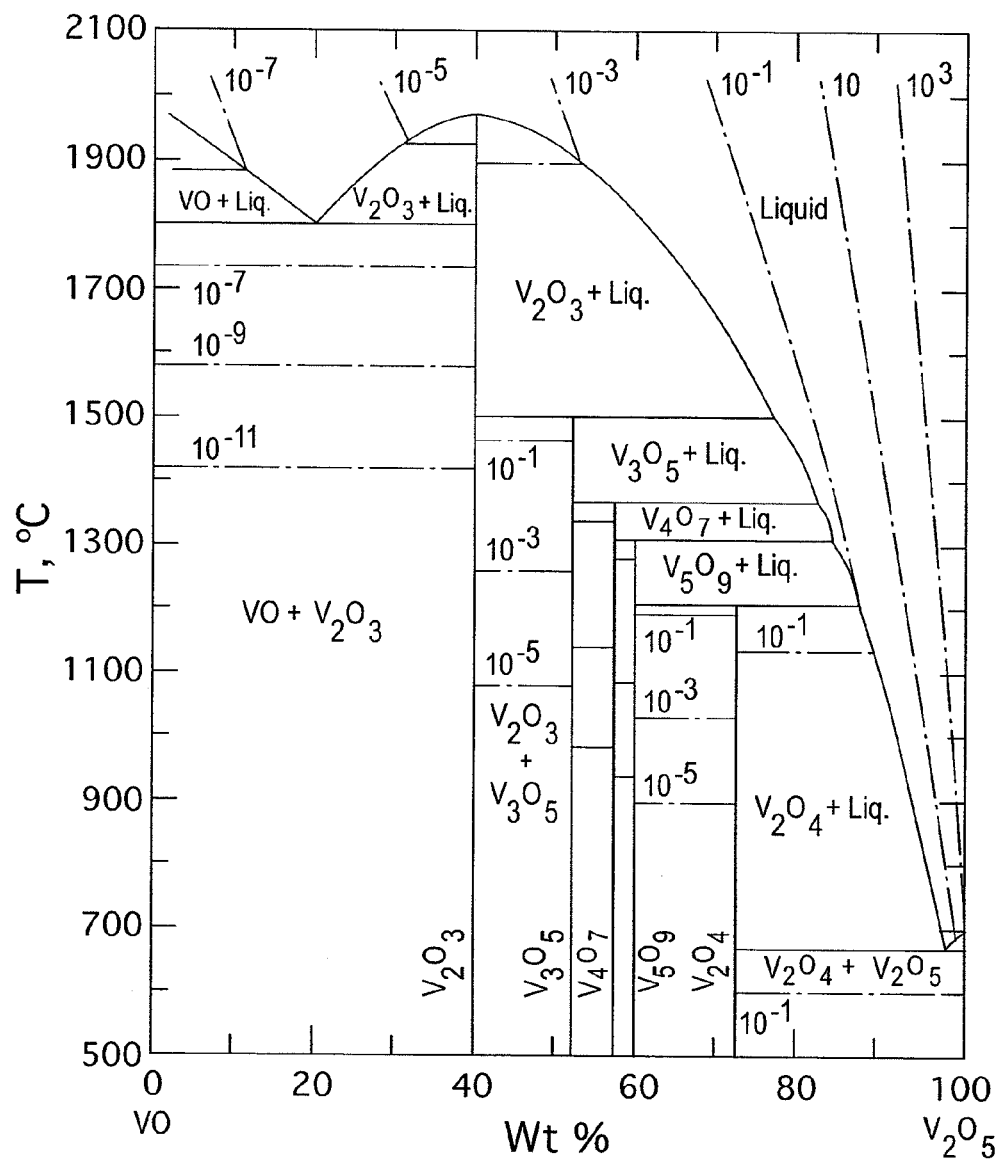
FIG. 1 is a phase diagram for the vanadium oxygen system.

This invention provides a method for the concentration of vanadium (as a suboxide) from carbonaceous feedstock materials containing vanadium and other residues resulting from the gasification or incomplete combustion of petroleum vacuum residuum, petroleum coke, kerogen from oil shale, and bituminous sand, e.g., tar sand or oil sand, or extra heavy oil. This invention employs the fact that suboxides of vanadium exhibit extremely high melting points relative to the melting point of the most oxidized form of vanadium. FIG. 1 is a phase diagram for the vanadium-oxygen system and illustrates the relationship between the melting point and the degree of oxidation, and until the slagging point of the concentrated vanadium residue is reached, the formation of eutectic mixtures with even more undesirable thermophysical properties is curtailed. As a result, by operating a process that effects the oxidation of the carbonaceous residue without completely oxidizing the vanadium species one can create a residue where enough of the carbon has been oxidized to remove the surrounding bulk organic phase and dense matrix of polycyclic hydrocarbons along with carbon from the porphyrin-like cage surrounding the vanadium species, but leaving sufficient carbon in the residue to ensure vanadium pentoxide is reduced by the carbon. Such a residue, while still containing some carbon, is better suited for reclamation by other methods, including chemical extraction, as the vanadium species are no longer sequestered by bulk carbon phases.

Figure 2:
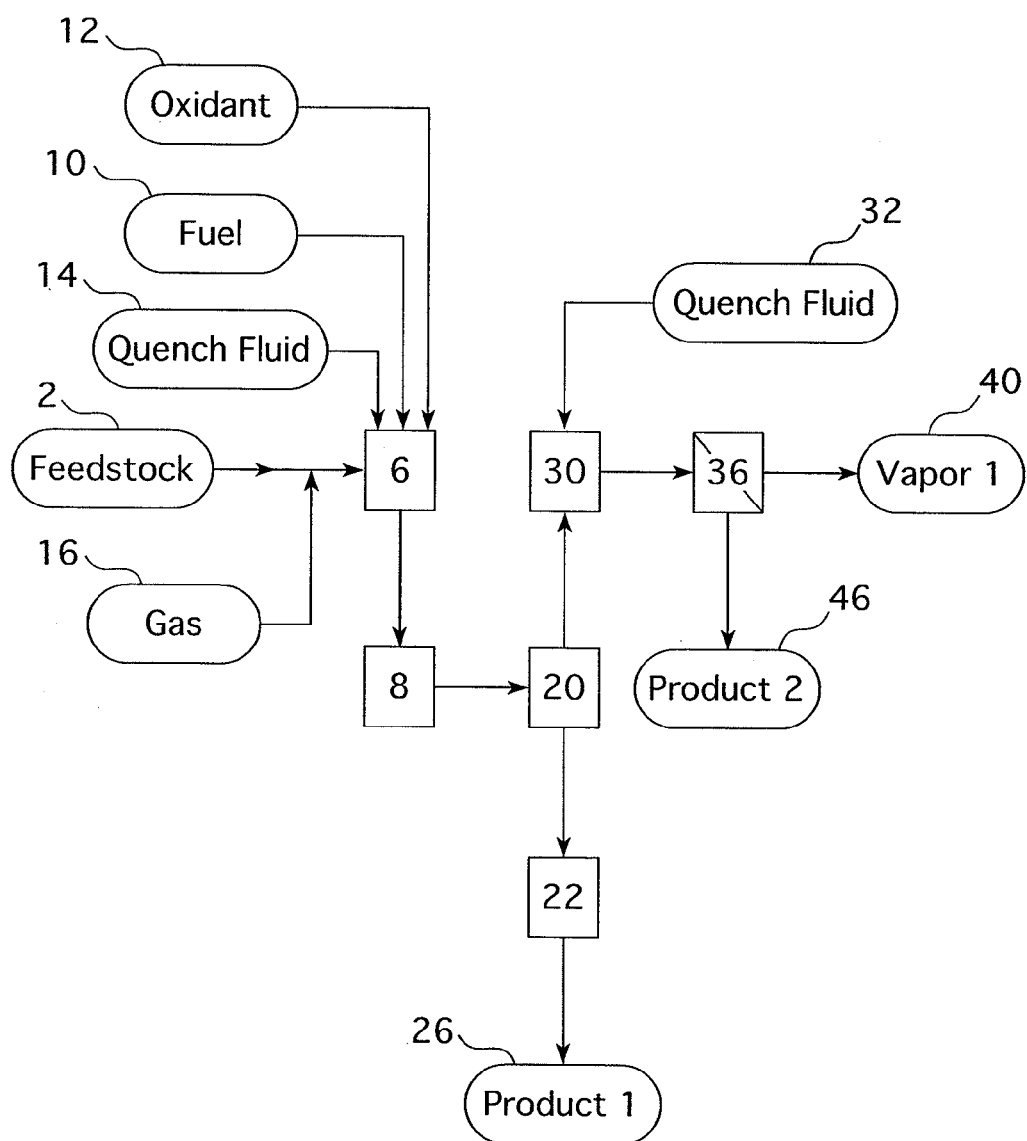
FIG. 2 is a process flow diagram showing a preferred process sequence of the present invention whereby two vanadium-rich products are manufactured.

The basic process for the concentration of vanadium from carbonaceous feedstock materials containing vanadium, such as residues, ashes and soots, derived from the incomplete combustion or gasification of petroleum vacuum residuum, petroleum coke, kerogen from oil shale, and bituminous sand, e.g., tar sand or oil sand, or extra heavy oil is shown in FIG. 2.

The process begins with the delivery of vanadium containing feedstock materials 2, preferably residue, ash, or soot as a dry, fine granular particulate, or as a slurry, to an entrained-flow reactor assembly 6, 8. A preferred maximum size of the feedstock materials is about 90% less than 30 mesh to effect rapid heating and oxidation in the entrained-flow reactor. The feedstock, if as a dry particulate, is preferably delivered by pneumatic transport using a compressed transport gas 16 or other suitable transport means to said entrained-flow reactor assembly. Otherwise, the feedstock, if as a slurry, is forced by a suitable pump through conveying piping or tubing and atomized by compressed gas 16 with a suitable injector assembly. Oxidant 12 and fuel 10 are added to the entrained-flow reactor assembly to create and maintain a high-temperature environment within the entrained-flow reactor assembly. The preferred stoichiometry for the oxygen, carbon, and sulfur reactions within the entrained-flow reactor is in the range of 90% to 105%, and the preferred reactor operating temperatures are in the range of about 2100° F. to 2900° F. Depending on the carbon and sulfur content of the feedstock, quench fluids 14 (with or without atomization) may be added to the process to limit the maximum operating temperature within the entrained-flow reactor assembly. The purpose of the entrained-flow reactor assembly 6, 8 is to rapidly heat and oxidize residual carbon and sulfur residing on/in the feedstock while restraining the formation of vanadium pentoxide and its resultant low melting temperature and corrosive slag. This is accomplished by controlling the stoichiometry, operating temperature and residence time within the entrained flow reactor. A preferred gas residence time within the entrained-flow reactor 6,8 assembly is in the range of 100 ms to 2 seconds for vortex type entrained flow reactors. With pulverized fuel burners or combustors residence times of about 1 to 3 seconds is preferred. The particulate-laden vapor stream issuing from the entrained-flow reactor 6,8 enters a preferably vertically oriented high temperature cyclone separator 20. The operating temperature of the cyclone separator is in the range of about 1800° F. to 2900° F. Typical particle separation efficiencies are greater than 90% for particles with diameters greater than 40 microns. The separation efficiency of this device diminishes with decreasing particle size and separation efficiencies decrease to less than 50% for particles with diameters less than about 20 microns. A solid, vanadium-rich, granular product exits the bottom of the cyclone 20 and enters collection chamber 22 for cooling of the product prior to its discharge and collection as a vanadium-rich granular product 26 (Product 1) with particle sizes typically greater than 40 microns. The particulate-laden vapor stream (containing the finer particulate) exiting the top of the cyclone separator 20 enters a gas quench assembly 30 which receives quench fluid 32 where the temperature of the particulate-laden vapor stream is rapidly reduced to about 1000° F. to 1800° F. to provide a suitable interface temperature for a high-temperature filter 36. Suitable, high-temperature filters are currently commercially available for operating temperatures in this range, such as ALB Klein's CERAFUME™ filter assemblies or Biothermica's Clinox™ sieves, which are both examples of suitable filters. However, if the continuous operating envelope of such filters or sieves can be extended to temperatures up to 2900° F., quenching of this stream may not be necessary. A vanadium-rich powder (Product 2) 46 is collected from the high-temperature particle filter 36. The essentially particle-free vapor (Vapor 1) stream 40 then enters a heat recovery system for recovery of the remaining chemical and sensible heat. An important advantage of the present invention is that the vanadium-rich products are removed prior to any heat recovery, thereby mitigating the possibility of fouling or slagging of the heat exchange surfaces, particularly if an afterburner is used to oxidize any residual carbon monoxide in the flue gas. The relatively clean flue gas also simplifies any subsequent acid gas scrubbing that may be required.

An example of an application of the invention relates to the recovery of vanadium from the ash generated by a utility boiler using vanadium containing petroleum coke as a fuel. The present invention facilitates the recovery of vanadium-rich products while exhausting a clean, low BTU content flue gas to an existing boiler for heat recovery and subsequent sulfur dioxide scrubbing using the boiler's existing systems for these latter process steps.

Figure 3:
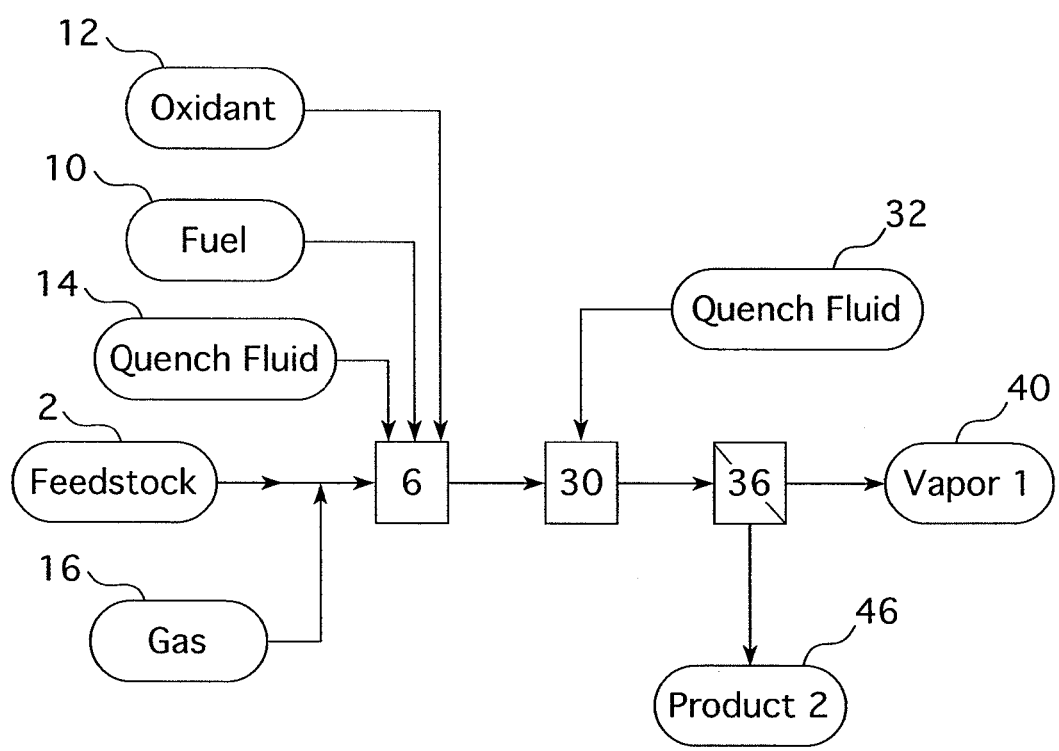
FIG. 3 is a process flow diagram of a process sequence of an alternative embodiment of the invention whereby one vanadium-rich product is manufactured.

FIG. 3 presents an alternative embodiment of the invention whereby the cyclone reactor 8 and high-temperature cyclone 20 are eliminated from the process sequence. In this embodiment, a single product (Product 2) is manufactured which comprises a vanadium-rich granular/powder product 46. The process configuration is simpler; however, it has the disadvantage of placing a higher particle loading duty on the filter assembly 36.

EXAMPLES

A number of pilot-scale trials were conducted with a vanadium containing feedstock to verify process performance. The pilot trials were performed with a system configuration and apparatus that included a loss-in-weight screw feeder for delivery of the feedstock, a combustion air delivery system, an oxygen delivery system, an entrained-flow reactor assembly consisting of a counter-rotating vortex reactor and a cyclone reactor, a high-temperature cyclone separator, a gas quench assembly, a low-temperature baghouse, and an acid gas scrubber. Provisions were present in the pilot-scale system for the collection of the a stream analogous to Product 1 (FIG. 1) (a vanadium-rich granular product) discharged from the high-temperature cyclone separator, as well as a stream somewhat analogous to Product 2 (a vanadium-rich powder product) from the low-temperature baghouse.

Although this invention is described in this work in conjunction with its preferred embodiments, it is to be understood that modifications, variations, and equivalently-functional methods and equipment may be utilized, substituted, or resorted to, without departing from the spirit and the scope of this invention, as those skilled in this art will understand. Such modifications, variations, and equivalently functional methods and equipment are within the purview and scope of this invention and the appended claims.

What is claimed is:

1. A method for the concentration of vanadium from carbonaceous feedstock materials containing vanadium comprising:
   (a) heating and oxidizing the carbonaceous feedstock material containing sulfur in counter-rotating vortex entrained-flow reactor at a sufficiently high temperature under near stoichiometric oxidizing conditions to effect the oxidation of carbon and sulfur species while maintaining at least a majority of the vanadium species as suboxides and having a particulate-laden vapor stream issue from said counter-rotating vortex entrained-flow reactor, and
   (b) separating a solid species from the particulate-laden vapor stream issuing from the entrained-flow reactor to yield a first vanadium-rich product.

2. The method of claim 1 including separating a second vanadium-rich product from said particulate-laden vapor stream to provide a second vanadium-rich product.

3. The method of claim 2 including employing a high temperature cyclone separator with an operating temperature range of about 1800° F. to 2900° F. in effecting the separation of said first vanadium-rich product.

4. The method of claim 2 including effecting said separation of said second vanadium-rich product in a filter.

5. The method of claims 1 including performing said method under conditions which resist slagging and agglomeration.

6. The method of claim 1 including creating a vanadium-rich product which is selected from the group consisting of granular vanadium oxides and powdered vanadium oxides.

7. The method of claim 3 wherein after said separating of said solid species to yield said first vanadium-rich product, quenching said particulate-laden vapor stream effluent issuing from said high temperature cyclone to a temperature sufficient to allow separation of said second vanadium-rich product in a high-temperature filter.

8. The method of claim 2 including effecting said separation of said second vanadium-rich product from the vapor stream in a high-temperature filter.

9. The method of claim 1 wherein said carbonaceous feedstock materials are selected from the group consisting of hydrocarbon residues, hydrocarbon ashes, and hydrocarbon soots.

10. The method of claim 1 including employing as said carbonaceous feedstock materials, materials generated by combustion or gasification of materials selected from the group consisting of petroleum vacuum residuum, petroleum coke, kerogen from oil shale, and bituminous sand.

11. The method of claim 1 including effecting said heating and oxidizing step in said counter-rotating vortex entrained flow reactor at a temperature in the range of about 2100° F. to 2900° F.

12. The method of claim 11 including effecting said heating and oxidizing step at oxidation stoichiometry in the range of about 90% to 105%.

13. The method of claim 7 including effecting said quenching at a temperature of about 1000° F. to 1800° F.

14. The method of claim 7 including effecting said separation of vanadium-rich solids from said particulate-laden vapor stream in a high-temperature filter capable of operating at a temperature of at least 1000° F.

15. The method of claim 7 including effecting said quenching at a temperature of about 500° F. to 1000° F.

16. The method of claim 7 including effecting said quenching at a temperature of about 300° F. to 500° F.

17. The method of claim 7 including effecting said separation of vanadium-rich solids from said vapor stream in a filter capable of operating at a temperature of about 300° F. to 1000° F.

18. The methods of claim 2 including effecting said separation of vanadium-rich solids from said vapor stream in a filter capable of operating at a temperature of about 500° F. to 1000° F.

19. The method of claim 1 including employing air in effecting said oxidizing in said entrained-flow reactor.

20. The method of claim 1 including employing oxygen in effecting said oxidizing said entrained-flow reactor.

21. The method of claim 1 including employing a mixture of air and oxygen in effecting said oxidizing in said entrained-flow reactor.

22. The method of claim 1 including employing carbonaceous feedstock materials containing vanadium with a size distribution of 90% less than 300 microns.

23. The methods of claim 1 wherein the carbonaceous feedstock material containing vanadium is selected from the group consisting of a carbonaceous ash and a soot obtained from a pulverized fuel-fired utility boiler employing vanadium-containing petroleum coke as a fuel.

24. The method of claim 23 including recovering heat by employing said pulverized fuel-fired utility boiler.

25. The method of claim 1 wherein the entrained-flow reactor consists of a counter-rotating vortex-entrained flow reactor and a cyclone reactor with a reactor gas residence time of about 100 ms to 2 seconds.

26. The methods of claim 1 wherein the residence time in the counter-rotating vortex entrained-flow reactor is about 1 second to 3 seconds.

* * * * *

UNITED STATES PATENT AND TRADEMARK OFFICE
CERTIFICATE OF CORRECTION

PATENT NO. : 8,277,766 B2  
APPLICATION NO. : 12/978686  
DATED : October 2, 2012  
INVENTOR(S) : James G. Hnat et al.

Page 1 of 1

It is certified that error appears in the above-identified patent and that said Letters Patent is hereby corrected as shown below:

In the Specifications:

Column 3, line 8, "3,196,617" should read --3,916,617--.
Column 3, line 20, "addition aluminum" should read --addition of aluminum--.
Column 8, line 35, "of the a stream" should read --of the stream--.
Column 8, line 54, "in counter-rotating" should read --in a counter-rotating--.

In the Claims:

Column 9, Claim 5, line 7, "claims" should read --claim--.
Column 10, Claim 18, line 11, "methods" should read --method--.
Column 10, Claim 20, line 18, "oxidizing said" should read --oxidizing in said--.
Column 10, Claim 23, line 25, "methods" should read --method--.
Column 10, Claim 26, line 36, "methods" should read --method--.

Signed and Sealed this
Fourth Day of June, 2013

Teresa Stanek Rea
*Acting Director of the United States Patent and Trademark Office*